(12) United States Patent
Hacker et al.

(10) Patent No.: US 11,590,583 B2
(45) Date of Patent: Feb. 28, 2023

(54) MACHINING TOOL, PROCESSING DEVICE AND METHOD FOR PROCESSING WORKPIECES

(71) Applicant: KENNAMETAL INC., Latrobe, PA (US)

(72) Inventors: Michael Hacker, Nuremberg (DE); Sebastian Kunschir, Winklarn (DE)

(73) Assignee: KENNAMETAL INC., Latrobe, PA (US)

( * ) Notice: Subject to any disclaimer, the term of this patent is extended or adjusted under 35 U.S.C. 154(b) by 48 days.

(21) Appl. No.: 16/648,520

(22) PCT Filed: Jul. 26, 2018

(86) PCT No.: PCT/EP2018/070250
§ 371 (c)(1),
(2) Date: Mar. 18, 2020

(87) PCT Pub. No.: WO2019/057369
PCT Pub. Date: Mar. 28, 2019

(65) Prior Publication Data
US 2020/0261988 A1    Aug. 20, 2020

(30) Foreign Application Priority Data
Sep. 22, 2017 (DE) ..................... 10 2017 216 860.9

(51) Int. Cl.
*B23B 29/02* (2006.01)
*B23B 35/00* (2006.01)

(52) U.S. Cl.
CPC .............. *B23B 29/02* (2013.01); *B23B 35/00* (2013.01); *B23B 2229/04* (2013.01)

(58) Field of Classification Search
CPC . B23B 51/0054; B23B 35/00; B23B 2229/04; B23B 2270/12; B23B 29/02;
(Continued)

(56) References Cited

U.S. PATENT DOCUMENTS 327,146 A    9/1885 Denny et al.
1,910,940 A    5/1933 Toske
(Continued)

FOREIGN PATENT DOCUMENTS

CA    2325061 A1    5/2001
CN    201070679 Y    6/2008
(Continued)

OTHER PUBLICATIONS

Mar. 12, 2021 Office action (3 months) (US Only) U.S. Appl. No. 16/654,686.
(Continued)

*Primary Examiner* — Eric A. Gates
*Assistant Examiner* — Paul M Janeski
(74) *Attorney, Agent, or Firm* — Christopher J. Owens

(57) ABSTRACT

The invention relates to a machining tool (2) for processing a bore in a workpiece, in particular for simultaneous processing of a plurality of bores distanced from one another by a predefined distance, said machining tool having a cutting body (8) extending in the direction of a tool longitudinal axis (4) and having at least one cutting element (12) arranged circumferentially, and a guide body (10), which adjoins the cutting body (8) in the direction of the tool longitudinal axis (4), is fastened to the cutting body (8) and has at least one circumferentially arranged guide element (20). The guide body (10) is free of cutting elements (12) and the guide body (10) is designed to exert a preload force such that, during use, the at least one guide element (20) is preloaded against a bearing for the guide body (10).

12 Claims, 3 Drawing Sheets

(58) Field of Classification Search
CPC . B23B 29/027; B23B 51/107; B23B 2251/56; B23B 2251/58; B23D 2277/46; B23D 2277/48
See application file for complete search history.

(56) References Cited

U.S. PATENT DOCUMENTS

| | | |
|---|---|---|
| 1,941,790 A | 1/1934 | Davis |
| 2,074,424 A | 3/1937 | Petersen |
| 2,187,221 A | 1/1940 | Brown |
| 2,426,359 A | 8/1947 | Sander et al. |
| 2,610,529 A | 9/1952 | Atkinson |
| 2,625,065 A | 1/1953 | Irishman |
| 2,842,014 A | 7/1958 | Miller |
| 3,191,463 A | 6/1965 | Ladendorf |
| 3,286,557 A | 11/1966 | Erich et al. |
| 3,358,531 A * | 12/1967 | Schaffler ............ B23B 29/027 408/201 |
| 3,386,317 A | 6/1968 | Flick et al. |
| 3,417,642 A | 12/1968 | Louis |
| 3,530,744 A | 9/1970 | Jacobson et al. |
| 3,795,160 A | 3/1974 | Janiszewski |
| 3,880,545 A | 4/1975 | Kress |
| 3,935,764 A | 2/1976 | Janiszewski |
| 3,981,210 A | 9/1976 | Janiszewski |
| 4,129,400 A | 12/1978 | Wozar |
| 4,224,846 A | 9/1980 | Eysel et al. |
| 4,293,252 A | 10/1981 | Kress et al. |
| 4,294,319 A | 10/1981 | Guergen |
| 4,425,063 A | 1/1984 | Striegl |
| 4,596,498 A | 6/1986 | Kress |
| 4,850,757 A | 7/1989 | Stashko |
| 5,149,233 A | 9/1992 | Kress et al. |
| 5,191,864 A | 3/1993 | Santi |
| 5,486,075 A | 1/1996 | Nakamura et al. |
| 5,865,573 A | 2/1999 | Kress |
| 5,906,458 A | 5/1999 | Planche |
| 5,957,633 A | 9/1999 | Hall |
| 6,033,159 A | 3/2000 | Kress et al. |
| 6,254,319 B1 | 7/2001 | Maier et al. |
| 6,287,057 B1 | 9/2001 | Kurz |
| 6,343,899 B1 | 2/2002 | Straub et al. |
| 6,379,090 B1 | 4/2002 | Halley et al. |
| 6,536,997 B1 | 3/2003 | Kress |
| 6,554,549 B1 | 4/2003 | Kurz |
| 6,676,338 B2 | 1/2004 | Kress et al. |
| 7,089,837 B2 | 8/2006 | Feil et al. |
| 7,114,893 B2 | 10/2006 | Mast et al. |
| 7,363,692 B2 | 4/2008 | Kress et al. |
| 7,545,420 B2 | 6/2009 | Kondo |
| 7,632,050 B2 | 12/2009 | Nuzzi et al. |
| 8,506,210 B2 * | 8/2013 | Nedzlek ................ B23B 29/02 408/83 |
| 9,789,547 B2 | 10/2017 | Hacker et al. |
| 10,654,110 B2 | 5/2020 | Hacker et al. |
| 2003/0077135 A1 | 4/2003 | Agarico |
| 2003/0103821 A1 | 6/2003 | Kress et al. |
| 2003/0175085 A1 | 9/2003 | Prokop |
| 2004/0096283 A1 | 5/2004 | Nomura |
| 2004/0169896 A1 | 9/2004 | Kondo |
| 2005/0109182 A1 | 5/2005 | Murakami et al. |
| 2005/0169721 A1 | 8/2005 | Schulte |
| 2006/0045640 A1 | 3/2006 | Hessman |
| 2007/0237592 A1 | 10/2007 | Nomura et al. |
| 2008/0152445 A1 | 6/2008 | Jensen et al. |
| 2008/0193234 A1 | 8/2008 | Davancens et al. |
| 2010/0054879 A1 | 3/2010 | Nedzlek |
| 2011/0085862 A1 | 4/2011 | Shaffer |
| 2011/0176878 A1 | 7/2011 | Nomura |
| 2012/0020750 A1 | 1/2012 | Bitzer et al. |
| 2012/0039675 A1 | 2/2012 | Men et al. |
| 2012/0251254 A1 | 10/2012 | Durand-Terrasson |
| 2013/0004253 A1 | 1/2013 | Kauper et al. |
| 2013/0078045 A1 | 3/2013 | Randecker et al. |
| 2014/0169896 A1 | 6/2014 | Kunschir |
| 2016/0114401 A1 | 4/2016 | Hacker et al. |

FOREIGN PATENT DOCUMENTS

| | | |
|---|---|---|
| CN | 105921822 A | 9/2016 |
| CN | 103862110 A | 10/2017 |
| CN | 103862110 B | 10/2017 |
| DE | 542338 C | 1/1932 |
| DE | 1627222 U | 8/1951 |
| DE | 1922131 U | 8/1965 |
| DE | 1239911 B | 5/1967 |
| DE | 1627222 A1 | 8/1970 |
| DE | 1922131 A1 | 10/1970 |
| DE | 2237743 A1 | 2/1974 |
| DE | 3022984 A1 | 1/1982 |
| DE | 3316053 A1 | 11/1984 |
| DE | 3402551 A1 | 8/1985 |
| DE | 3419350 A1 | 11/1985 |
| DE | 230810 A1 | 12/1985 |
| DE | 3429498 A1 | 2/1986 |
| DE | 3022984 C2 | 5/1986 |
| DE | 3429498 C2 | 8/1987 |
| DE | 255679 A1 | 4/1988 |
| DE | 3820485 C1 | 8/1989 |
| DE | 3842437 A1 | 6/1990 |
| DE | 3939339 A1 | 6/1990 |
| DE | 3316053 C2 | 6/1992 |
| DE | 3842437 C2 | 8/1992 |
| DE | 19720823 A1 | 11/1998 |
| DE | 19721997 A1 | 12/1998 |
| DE | 102005017285 A1 | 10/2006 |
| DE | 102006024569 A1 | 12/2007 |
| DE | 102004052211 B4 | 7/2008 |
| DE | 102010018339 A1 | 10/2011 |
| DE | 102012223183 A1 | 7/2014 |
| DE | 102012223183 B4 | 7/2014 |
| DE | 202013012454 U1 | 11/2016 |
| EP | 0099995 A2 | 2/1984 |
| EP | 0099995 B1 | 10/1991 |
| EP | 0558811 A1 | 9/1993 |
| EP | 0558811 B1 | 4/1995 |
| EP | 0970770 A1 | 1/2000 |
| EP | 0771602 A1 | 2/2001 |
| EP | 0771602 B1 | 2/2001 |
| EP | 0970770 B1 | 6/2002 |
| EP | 1561535 A1 | 8/2005 |
| EP | 2198996 A2 | 6/2010 |
| EP | 1561535 B1 | 1/2012 |
| EP | 2745967 A1 | 6/2014 |
| GB | 2075383 A | 11/1981 |
| JP | H01306122 A | 12/1989 |
| JP | H02190215 A | 7/1990 |
| JP | 2001121319 A | 5/2001 |
| JP | 2007098511 A | 4/2007 |
| JP | 2007223177 A | 9/2007 |
| JP | 2001525733 A | 10/2007 |
| JP | 2008168393 A | 7/2008 |
| JP | 5038606 B2 | 10/2012 |
| WO | 0245892 A1 | 6/2002 |
| WO | 2005061164 A1 | 7/2005 |
| WO | 2011142370 A1 | 11/2011 |
| WO | 2014195007 | 12/2014 |

OTHER PUBLICATIONS

Jan. 12, 2021 Notice of Allowance HU App. No. 1800094.
Nov. 4, 2020 Notice of Allowance CN App. No. 108620613A.
Oct. 16, 2020 Notice of Allowance FR App. No. 1852466.
International Search Report and Written Opinion corresponding to PCT/EP2018/070250, dated Oct. 22, 2018, 11 pages.
Jul. 3, 2020 Office Action (non-US) CN App No. 108620613A.
Oct. 18, 2021 Non-Final OA—U.S. Appl. No. 16/654,686.
Sep. 27, 2021 Foreign OA—DE App. No. 102013022595.7.
Oct. 22, 2013, First Office Action DE Application No. DE102012223183.8, 8 Pages.

(56) References Cited

OTHER PUBLICATIONS

Oct. 13, 2014, International Search Report and Written Opinion for International Application No. PCT/EP2014/001486, 11 Pages.
Jul. 21, 2015, German Office Action Prepared Application No. DE102013210332.8, 5 Pages.
Oct. 12, 2015, Israel First Office Action IL Application No. 229547, 4 Pages.
Oct. 19, 2015, Office Action (3 months) 1 U.S. Appl. No. 14/102,696, 25 Pages.
Feb. 9, 2016, Notice of Allowance.
Nov. 28, 2016, First Office Action CN Appl. No. CN201310677120, 14 pages.
Jan. 17, 2017, Second Office Action DE Application No. 102013210332.8, 03 Pages.
Jan. 26, 2017, Office Action (3 months) 1 U.S. Appl. No. 14/895,852 (9789547), 16 Pages.
Feb. 16, 2017, Second Office Action IL Application No. IL20130229547, 4 Pages.
Apr. 7, 2017, Office Action U.S. Appl. No. 14/440,397, 12 Pages.
Jun. 12, 2017, Second Office Action CN Application No. 201310677120.0, 7 Pages.
Jun. 13, 2017, Notice of Allowance.
Aug. 22, 2017, Notice of Allowance CN Application No. 201310677120.0, 5 Pages.
Oct. 11, 2017, Notice of Allowance.
Dec. 18, 2017, Notice of Allowance.
Feb. 7, 2018, First Office Action DE Application No. 102017204858.1, 14 Pages.
Mar. 5, 2018, Notice of Allowance.
Apr. 3, 2018, Office Action (3 months) 1 U.S. Appl. No. 15/852,703, 30 Pages.
Jul. 20, 2018, Novelty Search Report HU Application No. P1800094, 1 Page.
Aug. 3, 2018, Office Action (non-US) AT Application No. A501952018, 3 Pages.
Aug. 6, 2018, Final Office Action U.S. Appl. No. 15/852,703, 14 Pages.
Aug. 6, 2018, Office Action (non-US) DE Application No. DE102017216860A1, 18 Pages.
Oct. 15, 2018, Advisory Action U.S. Appl. No. 15/852,703, 8 pages.
Nov. 9, 2018, 2018 Advisory Action U.S. Appl. No. 15/852,703 (received), 2 pages.
Jan. 22, 2019, Office Action U.S. Appl. No. 15/852,703, 19 Pages.
Mar. 21, 2019, Non-Final Office Action (3 months) (US Only) U.S. Appl. No. 15/922,233, 23 Pages.
May 24, 2019, Final Office Action (US Only) US App. No. 20180154472A1.
Jul. 31, 2019, Advisory Action (PTOL-303) 1 US App. No. 20180154472A1.
Jan. 16, 2020, Office action (3 months) (US Only) US App. No. 20180154472A1.
Jan. 27, 2020, Notice of Allowance US App. No. 20180272434A1.
Feb. 3, 2020, Exam Notice CN Application No. CN201810233750.1, 2 Pages.
Feb. 24, 2020, Search Report FR Application No. FR1852466, 22 Pages.
Apr. 30, 2020, EPO Notification (R16141) & R.162 EP Application No. EP18746905.1, 3 Pages.
May 14, 2020, Office Action (non-US) HU Application No. P1800094/12, 3 Pages.
Jun. 18, 2020, Notice of Allowance US App. No. 20180154472A1.
Oct. 4, 2021, Non-Final OA U.S. Appl. No. 16/648,520, 30 Pages.
Jul. 25, 2022, Foreign Office Action Chinese Application No. 201880061247.0, 15 Pages.
Aug. 30, 2022, Foreign Office Action Mexican Application No. MX/a/2018/003441, 6 pages.
Die Quadratur Des Kreises, Maschine + Werkzeug, Heft Jun. 2015, Seite 88-91.
Hacker M., et al., Machine Translation, International Application No. PCT/EP2014/001486 (WO/2014/195007), Mar. 6, 2014 (Year: 2014).
International Preliminary Report on Patentability for International Application No. PCT/EP2014/001486, dated Dec. 17, 2015, 13 Pages.
International Preliminary Report on Patentability for International Application No. PCT/EP2018/070250, dated Apr. 2, 2020, 11 Pages.
International Search Report and Written Opinion for International Application No. PCT/US2013/062225, dated Jun. 18, 2014, 12 Pages.
International Search Report for International Application No. PCT/EP2014/001486, dated Oct. 13, 2014, 5 Pages.
"Reaming tool with guides engaging machined bore has second guide on opposite side of reamer from cutter," Machine translation of German Patent document DE3429498, Mapal, Aug. 1986, 2 pages.
Written Opinion for International Application No. PCT/EP2014/001486, dated Oct. 13, 2014, 10 Pages.

\* cited by examiner

MACHINING TOOL, PROCESSING DEVICE AND METHOD FOR PROCESSING WORKPIECES

This application is a U.S. National Phase of PCT/EP2018/070250, filed Jul. 26, 2018, which claims priority to German patent application no. 10 2017 216 860.9 filed Sep. 22, 2017, each of which is hereby incorporated by reference in its entirety.

BACKGROUND OF THE INVENTION

The invention relates to a machining tool, in particular a line boring bar, having the features of the preamble of claim 1, a processing device having a corresponding machining tool and a method for processing workpieces with the aid of such a machining tool.

Such a machining tool is described in WO 2014/195007 A1, for example.

Bearing shafts, for example camshafts or crankshafts in motor vehicles, are usually mounted on a plurality of axially spaced bearing webs in bearing bores, simply referred to hereinafter as bores. The individual bores are usually drilled to an end dimension using a so-called line boring bar. The line boring bar has cutting edges which are offset from one another in axial direction by the respective distance measurement and are each intended for processing a respective bore, so that, using such a line boring bar, several of the bores can be processed simultaneously by the cutting edges which are spaced apart in axial direction. Working positions with one respective cutting edge are therefore formed on the boring bar in accordance with the spacing of the bores. Usually only one cutting edge is formed for each working position.

For the drilling process, the boring bar typically has to be guided or supported. Direct support of the boring bar in the area of the respective cutting edges by guide elements, as is known in the case of reamers for example, is sometimes not easily possible.

OBJECT OF THE INVENTION

Proceeding from this, the invention is based on the object of specifying an advantageously configured machining tool, an advantageously configured processing device and an advantageous method for processing workpieces.

SOLUTION OF THE PROBLEM

This object is achieved according to the invention with a machining tool having the features of Claim 1, a processing device having the features of Claim 13 and a method having the features of Claim 14. Preferred further developments are respectively set out in the subclaims. The advantages and preferred configurations mentioned with regard to the machining tool can analogously also be applied to the processing device and/or the method and vice versa.

A corresponding machining tool is typically configured as a drill, a boring bar or a line boring bar and is designed for processing a bore of a workpiece, and in particular for simultaneously processing a plurality of bores which are spaced apart from one another by a predefined distance. For this purpose, the machining tool comprises a cutting body which extends in the direction of a tool longitudinal axis, on the circumference of which at least one cutting element is arranged, and in particular a plurality of cutting elements are arranged, which are spaced apart from one another by the predefined distance. The machining tool further comprises a guide body which, viewed in the direction of the tool longitudinal axis, adjoins the cutting body and is fastened to the cutting body, and on the circumference of which at least one guide element is arranged. The guide body is free of cutting elements, and the guide body is also configured to exert a preload force such that, during use, i.e. in particular during the processing of a workpiece, at least the at least one guide element is preloaded against a wall of a bearing or against a wall of a bearing bore for the guide body.

In some cases, the machining tool is designed and configured for a given bearing, i.e. in particular a given bearing bore having a given diameter, and the provided preload force then accordingly typically occurs only when the machining tool is guided into such a bearing, i.e. into such a bearing bore. In these cases, appropriately adapted machining tools are typically provided for different bearings or bearing bores having a variety of diameters. Alternatively, or in addition to this, a corresponding machining tool is designed such that it can be adapted to different bearings or bearing bores having different diameters, for example by means of an adjusting mechanism.

In the preloaded state of the machining tool, the at least one guide element of the guide body then rests against a wall of a bearing or a bearing bore of a workpiece for which the machining tool is designed and configured with an intended and correspondingly predetermined contact pressure, as a result of which the preloading of the machining tool is ultimately achieved. During processing of the workpiece, the machining tool is preloaded against the bearing or the bearing bore, which has a favorable effect on the precision of the machining tool. This is due to the fact that appropriate preloading typically ensures a very secure seating of the machining tool, for example in a receiving bore or bearing bore, and prevents the tool from lifting away from the bore wall. This results in a relatively robust and precise operation of the machining tool.

Depending on the application, the cutting body of the machining tool, which is also referred to as the cutting part, is configured to be cylindrical, for example, or, as is the case with the base body of WO 2014/195007 A1 for example, has an eccentric area when viewed in cross-section. In this case, the cutting body then comprises a base body and a balancing element, for example; analogous to the base body described in WO 2014/195007 A1. Reference is therefore hereby expressly made to WO 2014/195007 A1, in particular with regard to possible design variants of the cutting body of the machining tool described here. The tool longitudinal axis furthermore typically substantially coincides with a central longitudinal axis of the cutting body and/or a center of mass axis of the cutting body.

The guide body, on the other hand, is cylindrical and comprises on its circumference at least one guide element for guiding the guide body, and thus the machining tool, on a workpiece to be processed, and in particular for guiding in a guide bore. A corresponding guide element is configured as a guide gib, for example, which preferably extends in the direction of the tool longitudinal axis or in the direction of a body longitudinal axis of the guide body.

The guide body, also referred to as a guide part, further preferably comprises the aforementioned body longitudinal axis, which is offset or displaced parallel to the tool longitudinal axis during use of the machining tool. In doing so, the tool longitudinal axis typically substantially coincides with the axis of rotation of the machining tool during use and thus during processing of a workpiece, so that, during use, the body longitudinal axis of the guide body is arranged eccentrically to the tool longitudinal axis and thus to the axis of rotation.

The body longitudinal axis of the guide body preferably corresponds to the central longitudinal axis of the guide body, as long as said guide body has a simple cylindrical shape. Irrespective of this, the body longitudinal axis of the guide body typically runs through the center of mass of the guide body and preferably through at least two centroids of two cross-sections of the guide body that are spaced apart from one another.

According to a further preferred design of the machining tool, the body longitudinal axis and thus the guide body can be displaced in a radial direction relative to the tool longitudinal axis by means of an adjusting mechanism, in particular in preloading direction. The preloading direction is the direction in which the preload force acts, i.e. in which the guide body is preloaded or is preloaded against a bearing or a bearing bore.

In an advantageous further development, the body longitudinal axis of the guide body is at least initially aligned parallel to the tool longitudinal axis and, in order to realize a first degree of freedom, in some cases the only degree of freedom, the adjusting mechanism is configured such that the body longitudinal axis and thus the guide body can be displaced in radial direction, in particular in preloading direction, relative to the tool longitudinal axis, in particular to realize an adaptability of the machining tool to different guide bores. The body longitudinal axis further preferably coincides with the tool longitudinal axis in an initial position of the guide body and is displaced radially outward for use of the machining tool, so that the tool longitudinal axis and the body longitudinal axis are subsequently offset parallel to one another. In the simplest case, the adjusting mechanism is configured such that only one degree of freedom is provided for the adjustability, which then enables a parallel displacement of the body longitudinal axis to the tool longitudinal axis, for example via an adjusting screw.

Alternatively or additionally, an adjustability is realized for the at least one guide element. If the guide element is configured as a guide gib, for example, the guide gib is displaced in radial direction. For a corresponding guide element, for example, such a displaceability can then be realized with the aid of one or more adjusting screws. If such an adjustability of the guide element is provided, an additional adjustability for the guide body is preferably omitted and there is then therefore preferably no change to the arrangement of the guide body relative to the cutting body.

It is also advantageous if the guide body has two guide elements, which are circumferentially arranged at two angle positions on the guide body and preferably at the same longitudinal position on the guide body when viewed in the direction of the tool longitudinal axis. An angle bisector is then assigned to the two angle positions, and the machining tool is further preferably configured such that the preload force extends in good approximation in the direction of the angle bisector.

In addition, the angle between the preloading direction, i.e. the direction of the preload force, and the angle bisector, or rather the direction of the angle bisector, is preferably less than 20% of the angle between the two angle positions, further preferably less than 10%, and in particular less than 5% of the angle between the two angle positions. If an adjusting mechanism is then provided, by means of which the guide body can be displaced in radial direction relative to the tool longitudinal axis, the displacement is preferably in preloading direction and more preferably in the direction of the angle bisector.

Such an adjusting mechanism, which enables displacement in radial direction and in particular in preloading direction, expediently comprises a guide rail, guide gib and/or guide groove which extends in radial direction and in particular in preloading direction, along which the guide body can be displaced relative to the cutting body. The cross-section of a corresponding guide rail, guide gib or guide groove is in the shape of a dovetail, for example.

According to a further design variant, to realize a degree of freedom and in particular a second degree of freedom, the adjusting mechanism is configured such that the guide body can rotated about the body longitudinal axis. Depending on the design variant, the corresponding rotatability is realized either alone or together with the previously described displaceability so as to realize a 1D adjustability with one degree of freedom or a 2D adjustability with two degrees of freedom.

Further expedient is a design of the adjusting mechanism in which, to realize a degree of freedom, in particular to realize a second or third degree of freedom, the adjusting mechanism is configured such that the body longitudinal axis can be tilted or bent relative to the tool longitudinal axis. Such an adjustability, which, depending on the design variant, is realized alone, together with one of the aforementioned or together with both of the aforementioned adjustment variants, enables an adjustability such as can, for example, be realized in a similar manner using a so-called SIF adapter. Tilting the body longitudinal axis relative to the tool longitudinal axis causes a desired wobbling of the machining tool.

According to a further advantageous design of the machining tool, the mass of the guide body is distributed unevenly around the tool longitudinal axis during use, in order to thus constructively specify a directed imbalance during rotation around the tool longitudinal axis. In the machining tool, such an imbalance is furthermore preferably only given in the region of the guide body, while the cutting body is preferably balanced with respect to a rotation about the tool longitudinal axis. The local center of mass of the machining tool is consequently in the region of the guide body and thus in the region of the free end of the machining tool offset to the axis of rotation of the machining tool. Therefore, during use of the machining tool, i.e. during rotation, a centrifugal force acts on the corresponding local center of mass, as a result of which the machining tool bends, whereby the free end, i.e. the guide body, is bent radially outwards starting from the axis of rotation, i.e. the tool longitudinal axis, and thus possibly pressed against a bore wall, i.e. the bearing or the bearing bore.

It is also expedient if the cutting body comprises a cutting element carrier, on which the at least one cutting element or a plurality of cutting elements is/are circumferentially arranged. The cutting element or cutting elements is/are preferably fastened to the cutting element carrier in a reversibly detachable manner and, in this case, the cutting elements are then further preferably configured as cutting inserts. A corresponding cutting element carrier is then made from a simpler tool steel, for example, while the cutting element or cutting elements typically consist(s) of a higher-quality hard metal, Cermet, PCD or PCBN.

If a plurality of cutting elements are provided, they are preferably arranged substantially in a line on the circumference of the cutting body when viewed in the direction of the tool longitudinal axis, in particular in a line parallel to the tool longitudinal axis. This means that the cutting elements in this case are distributed in the direction of the tool longitudinal axis and arranged circumferentially on the cutting body, but always positioned at the same angle position.

The cutting body further preferably comprises no guide elements, so that the cutting body preferably comprises only cutting elements and the guide body comprises only guide elements.

It is also expedient if the guide body has a guide element carrier, for example made of a simpler tool steel, on which the at least one guide element or the guide elements is/are arranged circumferentially and fastened in a reversibly detachable manner, but in particular in a non-detachable manner. The guide element or guide elements is/are then typically made from a higher-quality hard metal, Cermet or PCD.

It is also advantageous if the guide body is fastened to the cutting body in a reversibly detachable manner, for example with the aid of a screw connection.

The guide body further typically has an extension in the direction of the body longitudinal axis, the value of which is in the range between about 5 cm and about 9 cm, for example 7 cm. Regardless of the actual value, the extension of the guide body in the direction of the body longitudinal axis is preferably between 10% and 30% of the extension of the cutting body in the direction of the tool longitudinal axis.

In many cases, the machining tool is configured for processing workpieces in which the diameter of the bore or bores to be processed is substantially equal to the diameter of the bearing bore or the bearing. In this case in particular, the machining tool is then adapted to the corresponding workpieces and configured such that, during use, during rotation around the tool longitudinal axis, the at least one cutting element is guided along a cutting circle having a cutting radius, and that, during rotation around the tool longitudinal axis, the at least one guide element is guided along a guide circle having a guide radius, wherein the guide radius is greater than or equal to the cutting radius. If an adjusting mechanism is then provided for the machining tool, this adjusting mechanism is preferably configured such that the guide radius can be variably specified or variably adjusted by means of the adjusting mechanism, for example by forced guidance using a gearing, so that the adjusting mechanism enables a specification in which the guide radius is greater or equal to the cutting radius.

In this case, it is further advantageous if the difference between the cutting radius and the guide radius and/or between axes of the cutting radius and the guide radius is in a range between 50 and 200 µm. It is further preferred if the difference is greater than 25 µm, greater than 50 µm and in particular greater than 100 µm. It is also expedient if the difference is less than 300 µm, less than 200 µm and in particular less than 100 µm.

A previously described machining tool is preferably configured as an insert for a machine tool having a spindle and having a tool holder, and the machining tool accordingly expediently comprises a shaft or tool shaft which, viewed in the direction of the tool longitudinal axis, adjoins the cutting body opposite to the guide body. The shaft is preferably turned in one piece or monolithically and in particular configured as a clamping shaft or as a shaft for an HSK tool holder or a steep taper tool holder.

Together with a corresponding machine tool, the machining tool then forms a processing device for processing workpieces. The machine tool of the processing device preferably comprises a spindle having a tool holder, but without an alignment mechanism, and a previously described machining tool is further preferably connected directly to the spindle of the machine tool. This means that there is in particular no interposition of a so-called alignment adapter or a SIF adapter (SIF=Steerable InterFace).

Design examples of the invention are explained in more detail in the following using the figures.

DESCRIPTION OF THE FIGURES

In simplified, schematized illustrations, the figures respectively show.

Parts having the same effect are provided with the same reference signs in the figures.

DESCRIPTION OF THE DESIGN EXAMPLE

Figure 1:
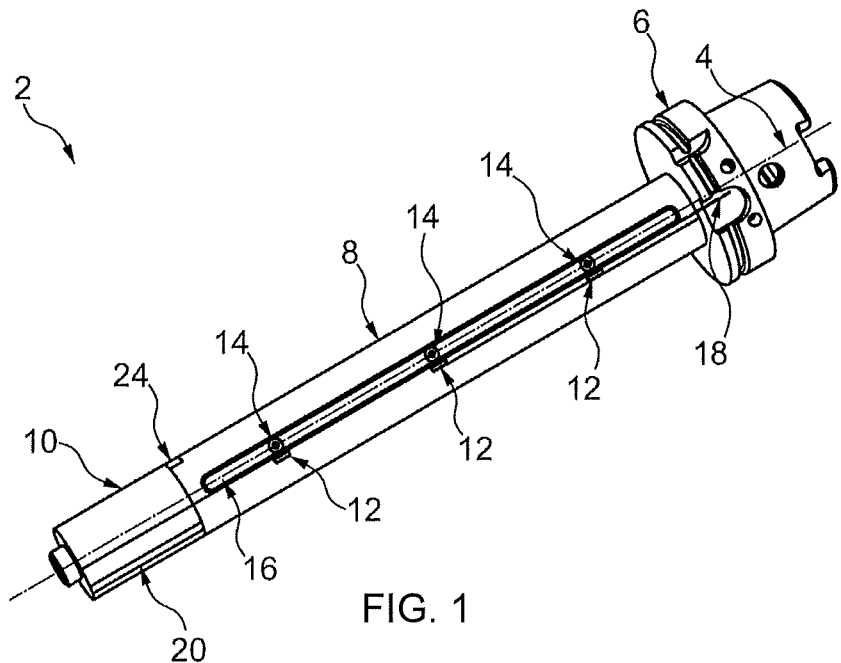
FIG. 1 a machining tool having a cutting body and a guide body in a first perspective view, FIG. 2 the machining tool having the cutting body and the guide body in a second perspective view, FIG. 3 the machining tool having the cutting body and the guide body in the second perspective view, wherein the guide body is displaced relative to the cutting body, FIG. 4 the machining tool having the cutting body and without the guide body in the second perspective view, FIG. 5 the guide body in a third perspective view and FIG. 6 the guide body in a fourth perspective view.
Figure 2:
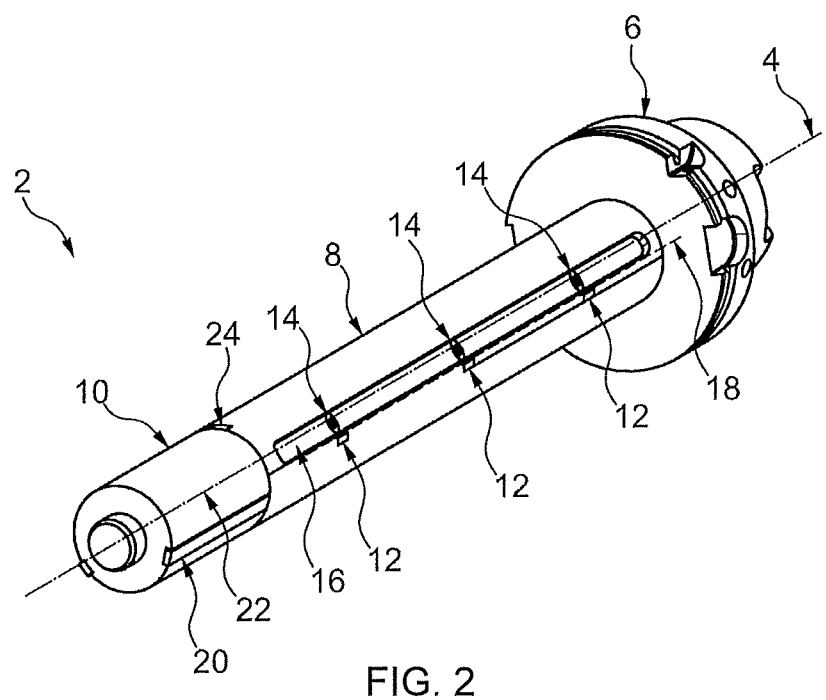
Figure 3:
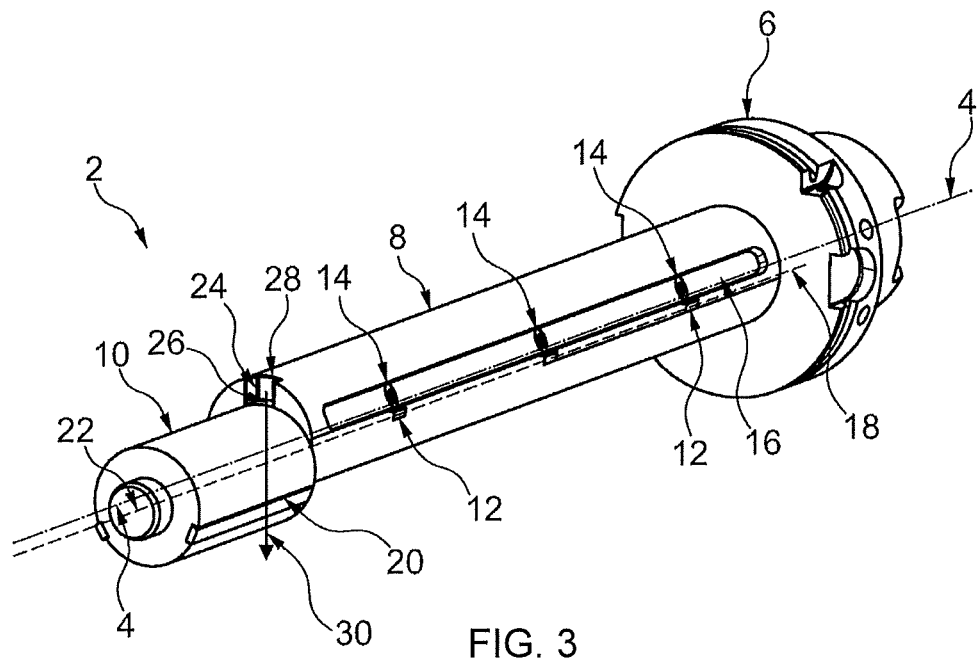

A machining tool 2, which is described below as an example and shown in FIG. 1, is used for simultaneously processing a plurality of bores which are spaced apart from one another by a predefined distance and is accordingly adapted to this intended application.

The machining tool 2 is extended along a tool longitudinal axis 4, wherein this tool longitudinal axis 4 represents a type of central longitudinal axis of the machining tool 2. The machining tool 2 further comprises a shaft 6, which can be inserted into a complementary tool holder of a spindle of a not depicted machine tool, and can thus be connected to the machine tool in a reversibly detachable manner. For processing workpieces, the shaft 6 of the machining tool 2 is then accordingly inserted into the tool holder of the machine tool and thus connected to the machine tool. The machining tool 2 is subsequently set in rotation with the aid of the spindle of the machine tool, whereby the axis of rotation coincides at least in good approximation with the tool longitudinal axis 4.

An exact coincidence is intended here, but this cannot always be realized because of the given manufacturing tolerances. The spindle nonetheless preferably has no alignment mechanism, and the machining tool is still preferably connected directly with the spindle without the interposition of an alignment adapter. The shaft 6 also preferably does not have an alignment mechanism and is further preferably configured in one piece or monolithically.

Viewed in the direction of the tool longitudinal axis 4, the shaft 6 is adjoined by a cutting body 8, which in the design example has a cylindrical shape and is non-detachably connected to the shaft 6. It can therefore not be detached from the shaft 6 in a non-destructive manner. On the end of the cutting body 8 opposite to the shaft 6, a guide body 10 is positioned, which during use of the machining tool 2 quasi forms the free end of the machining tool 2 and is preferably connected to the cutting body 8 in a reversibly detachable manner.

In the design example, three cutting elements 12 are arranged circumferentially on the cutting body 8, whereby each cutting element 12 is fastened in a reversibly detachable manner by means of a screw 14 to the cutting body 8, or rather to a cutting element carrier which also forms the cutting body 8. The cutting elements 12 can thus be replaced as needed. The screws 14 used for fastening the cutting elements 12 are expediently disposed in a depression 16 and, in the design example, the cutting elements 12 are arranged along a line 18 along the tool longitudinal axis 4, whereby the line 18 extends parallel to the tool longitudinal axis 4. The distance between the cutting elements 12 corresponds to the distance between the bores to be processed on the workpieces for which the machining tool 2 is designed.

In the design example, the guide body 10 likewise has a cylindrical shape. Two guide gibs 20 are positioned on the circumference of the guide body 10 as guide elements, whereby the guide rails 20 are arranged parallel to a body longitudinal axis 22 of the guide body 10. The body longitudinal axis 22 of the guide body 10 corresponds to a type of central longitudinal axis of the guide body 10, which also substantially coincides with the center of mass axis of the guide body 10 and thus runs through the center of mass of the guide body 10.

Figure 4:
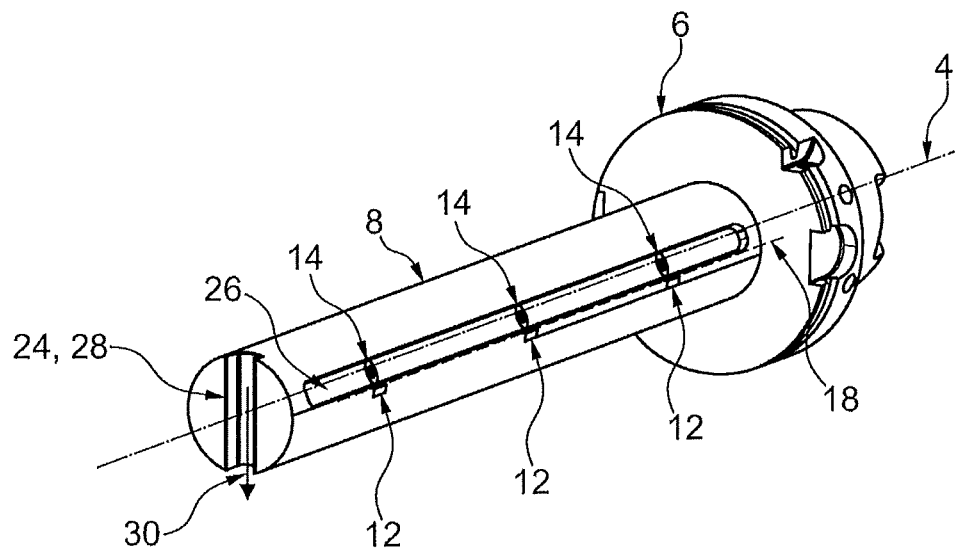
Figure 5:
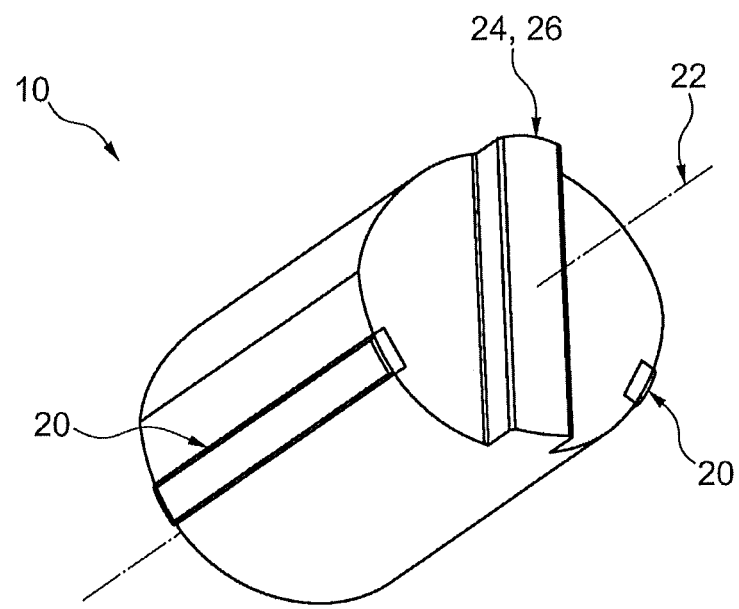
Figure 6:
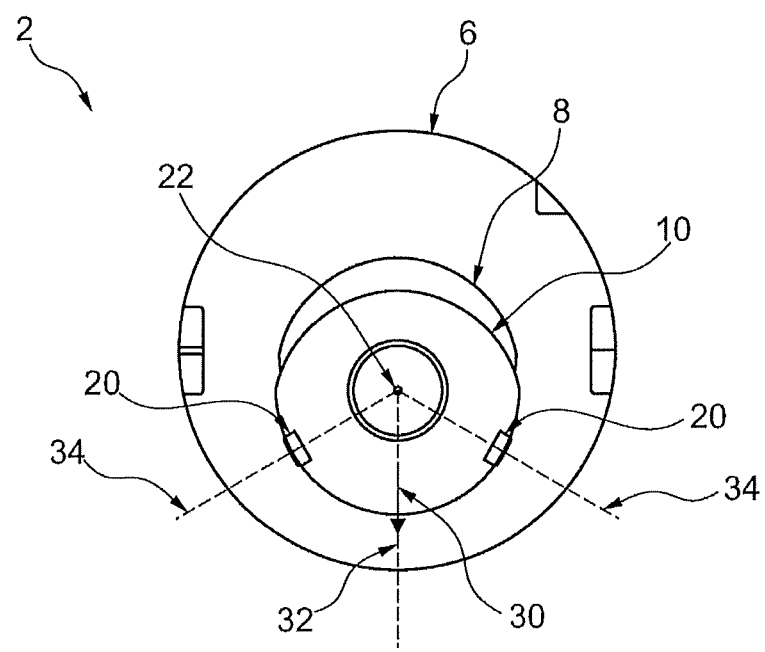

In the design example, the guide body 10 is not only connected to the cutting body 8 in a reversibly detachable manner, but also via an adjusting mechanism 24, which, as indicated in FIG. 4 and FIG. 5, comprises a rail 26 and a groove 28. The rail 26 is formed on the guide body 10, and the groove 28 is formed on the cutting body 8. This adjusting mechanism 24 allows the body longitudinal axis 22 and thus the guide body 10 to be displaced in a radial direction relative to the tool longitudinal axis 4 and thus to the cutting body 8. The respective displacement position is fixed by means of a not depicted screw, for example, or is variably specified or set by the rotational position of a screw. In an initial position or starting position, the guide body 10 is typically arranged such that the body longitudinal axis 22 of the guide body 10 coincides with the tool longitudinal axis 4.

However, for use of the machining tool 2, i.e. for processing a workpiece, the body longitudinal axis 22 of the guide body 10 is moved out of this starting position, so that the body longitudinal axis 22 and the tool longitudinal axis 4, and thus typically the axis of rotation of the machining tool 2, are disposed offset parallel to one another. The machining tool 2 is preloaded by means of a corresponding offset in order to achieve a secure guidance of the machining tool 2 on a bearing provided for this purpose, or in a bearing bore provided for this purpose, which has a beneficial effect on the processing precision.

Then, once the respective machining tool 2 is preloaded, the guide gibs 20 of the guide body 10 rest against a wall of the bearing or bearing bore with an intended and correspondingly predetermined contact pressure, as a result of which the preloading of the machining tool 2 is achieved. The direction of this contact pressure in the design example is specified by a preloading direction 30, which coincides in good approximation with a contact pressure angle bisector 32 that is determined by the two angle positions 34 of the two guide gibs 20.

The invention claimed is:

1. A machining tool for processing a bore of a workpiece comprising a cutting body extending in the direction of a tool longitudinal axis and having at least one circumferentially arranged cutting element,
characterized by
a guide body, which adjoins the cutting body in the direction of the tool longitudinal axis, is fastened to the cutting body and has at least one circumferentially arranged guide element, wherein the guide body is free of cutting elements and wherein the guide body is configured to exert a preload force such that, during use, the at least one guide element is preloaded against a bearing for the guide body, and
wherein the guide body comprises two guide elements which are circumferentially arranged at two angle positions, wherein an angle bisector is assigned to the two angle positions, and that the preload force extends in the direction of the angle bisector.

2. The machining tool according to claim 1,
characterized in that
the guide body comprises a body longitudinal axis which, during use, is arranged offset to the tool longitudinal axis.

3. The machining tool according to claim 2,
characterized in that
the guide body can be displaced radially relative to the tool longitudinal axis by means of an adjusting mechanism.

4. The machining tool according to claim 1,
characterized in that
the body longitudinal axis is aligned parallel to the tool longitudinal axis and that, in order to realize a degree of freedom, the adjusting mechanism is configured such that the body longitudinal axis can be displaced in radial direction relative to the tool longitudinal axis.

5. The machining tool according to claim 1,
characterized in that
the guide body comprises two guide elements which are circumferentially arranged at two angle positions, wherein an angle bisector is assigned to the two angle positions, and that the preload force extends in the direction of the angle bisector.

6. The machining tool according to claim 1,
characterized in that
the adjusting mechanism comprises a guide rail or guide groove, which extends in radial direction and along which the guide body can be displaced.

7. The machining tool according to claim 1,
characterized in that
during use, the mass of the guide body is distributed unevenly around the tool longitudinal axis in order to constructively specify a directed imbalance during rotation around the tool longitudinal axis, whereby in particular the distribution of the mass of the guide body around the tool longitudinal axis deviates from the distribution of the mass of the cutting body around the tool longitudinal axis.

8. The machining tool according to claim 1,
characterized in that during use,
during rotation around the tool longitudinal axis, the at least one cutting element is guided along a cutting circle having a cutting radius, and that, during rotation around the tool longitudinal axis, the at least one guide element is guided along a guide circle having a guide radius, wherein the guide radius is greater than or equal to the cutting radius.

9. The machining tool according to claim 1,
characterized in that
the cutting body circumferentially comprises a plurality of cutting elements which, viewed in the direction of the tool longitudinal axis, are arranged in a line.

10. The machining tool according to claim 1,
characterized in that viewed in the direction of the tool longitudinal axis, a shaft adjoins the cutting body opposite to the guide body.

11. A processing device for processing workpieces comprising a machine tool having a spindle without an alignment mechanism, characterized by a machining tool according to claim 1, wherein the machining tool is directly connected to the spindle.

12. A method for processing workpieces by means of a processing device comprising a machine tool having a spindle and comprising a machining tool according to claim 1, wherein a preload force is generated with the aid of the guide body during use.

\* \* \* \* \*